Feb. 11, 1958  F. C. SCHWANEKE  2,822,747
SKILLET

Filed Sept. 30, 1955  2 Sheets-Sheet 1

INVENTOR:
FRED C. SCHWANEKE
BY

ATT'YS

Feb. 11, 1958 F. C. SCHWANEKE 2,822,747
SKILLET
Filed Sept. 30, 1955 2 Sheets-Sheet 2
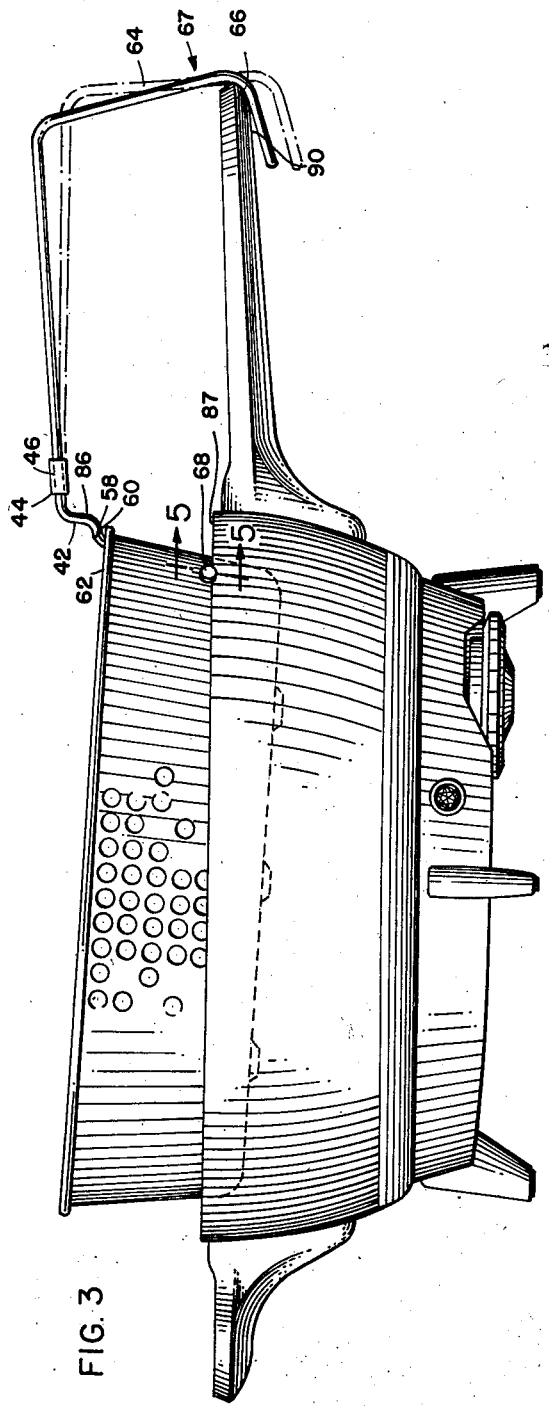
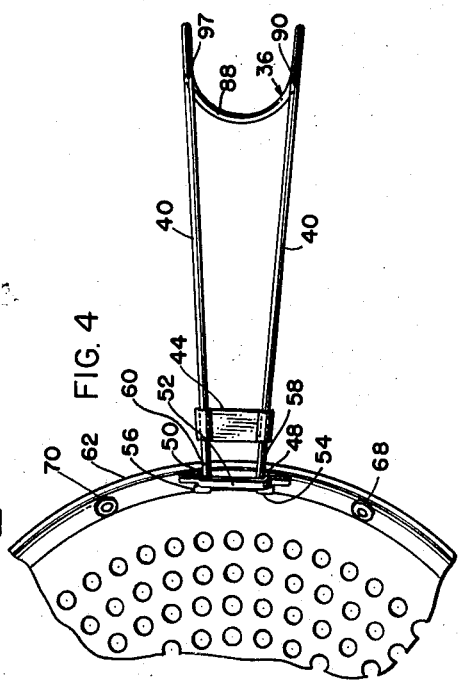
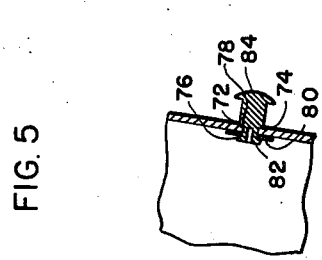
INVENTOR:
FRED C. SCHWANEKE
ATT'YS

United States Patent Office 2,822,747
Patented Feb. 11, 1958

2,822,747

SKILLET

Fred C. Schwaneke, Chicago, Ill., assignor to Dormeyer Corporation, Chicago, Ill., a corporation of Illinois Application September 30, 1955, Serial No. 537,756

6 Claims. (Cl. 99—411)

This invention relates to cooking utensils, and more particularly to means for locking a basket adapted to be removably received in an outer vessel of the utensil in a relatively elevated draining position on the vessel and for releasing it therefrom selectively.

Heretofore, deep fat fryers have been difficult to operate because no means were provided to hold the drainage basket in proper draining position, and skillets in particular have not been adapted for deep fat frying because there has not been available a drainage basket suitable for converting a skillet to this use.

It is, accordingly, an object of the present invention to provide a skillet which may be used as a deep fat fryer, and which has a basket adapted to seat within the skillet or be positioned securely in elevated draining position therein selectively.

Another object is to provide a handle for the basket described, which is adapted to lock with the elongate handle of the skillet to maintain the basket against rotation in the skillet when the basket is in draining position, while supporting the basket against tipping downwardly into the skillet.

Another object is to provide a pair of lugs adapted to rest on the edge of the skillet, for holding the basket in draining position in cooperation with the handle for the basket.

Another object is to provide a basket handle which is resilient, so as to afford downward movement toward the skillet handle to place the basket handle in an initial disengaged relationship with the skillet handle.

Another object is to provide lugs as described, which will track upon the edge of the skillet when the handle of the basket is in the aforementioned initial disengaged position, so that the basket and the handle therefore may be manually rotated on the skillet to place the basket handle in fully released position relative to the skillet handle.

Another object is to provide a basket handle which is longer by a predetermined amount than the skillet handle, and which has a downwardly extending portion adapted to clear the end of the skillet handle during the aforementioned rotation of the basket, the downwardly extending portion having integrally formed therewith a contoured portion underlying the elongate portion of the basket handle for selective locking engagement and disengagement with the skillet handle as described.

Yet another object is to provide a basket handle of the type described which is demountable, and which is formed of a pair of wire extensions spaced apart by a spacer slidably received thereon, the wire extensions being joined at their outer extremities by a U-shaped juncture corresponding to the aforementioned contoured portion and having their free ends bent downwardly to engage releasably with ears on the basket.

Another object is to provide a skillet and drainage basket which may be carried as a unit from kitchen to table, for example, the basket handle being given a configuration such as to permit grasping the skillet handle easily while the basket is locked in draining position on the skillet.

Another object is to provide a deep fry skillet of the type indicated which may be used wherever electricity is available to apply even cooking temperatures to the foods being fried.

Other objects and advantages of the invention will become apparent as the description proceeds in accordance with the drawings, in which:

Fig. 3 is a side elevational view of the skillet of the invention, showing the basket locked in draining position on the skillet;

Fig. 4 is a fragmentary top plan view of the basket and the handle therefor; and Fig. 5 is a vertical sectional view taken through the lines 5—5 of Fig. 3, showing support and guide lugs for holding the basket in draining position on the skillet.

Figures 1, 2:
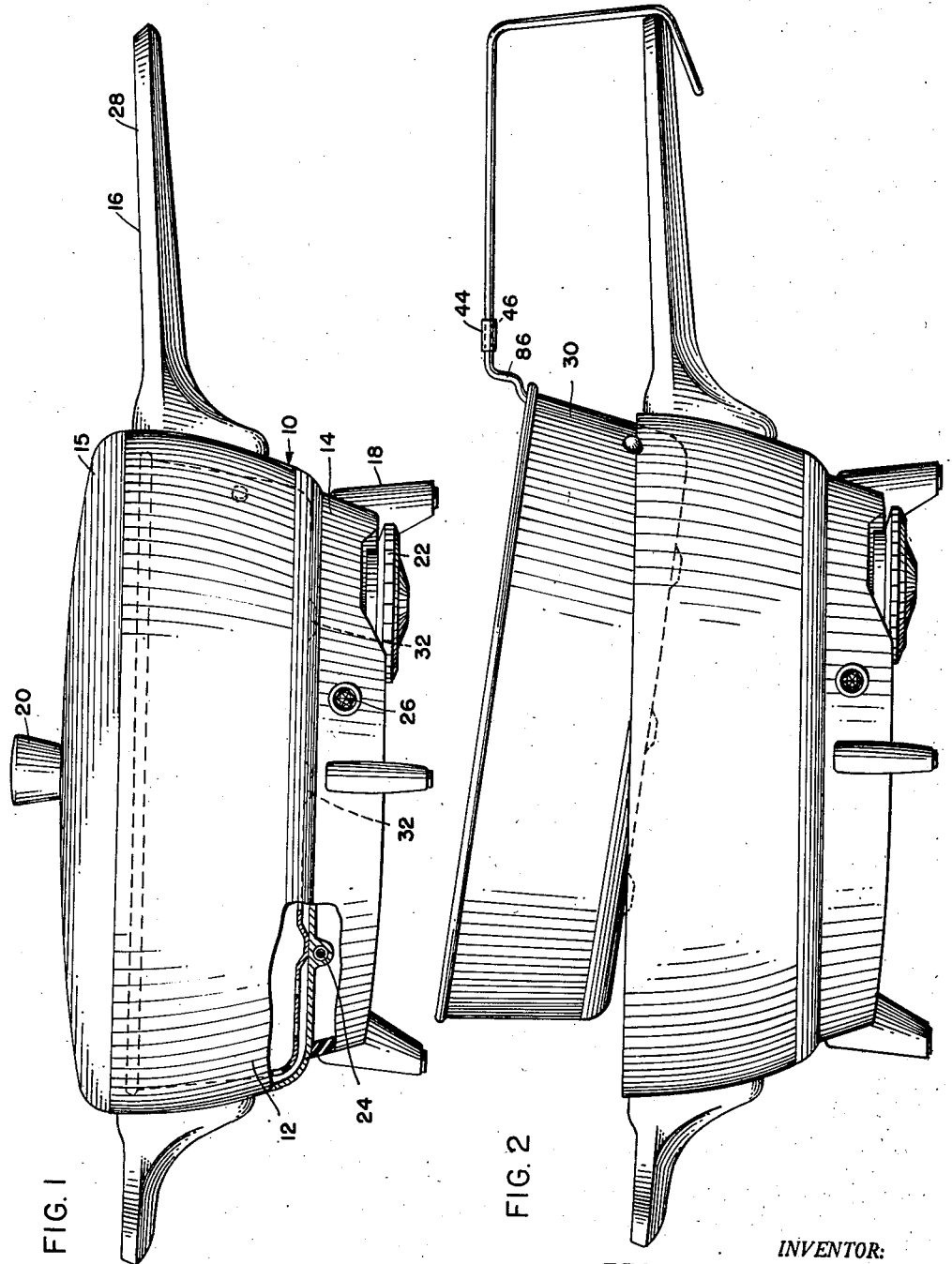
Fig. 1 is a side elevational view of a skillet according to the present invention, partly broken away and showing in dot-and-dash a basket for holding foods to be fried.
Fig. 2 is a side elevational view of the skillet of Fig. 1 showing the basket during its release from locked engagement with the skillet.

Referring now to Fig. 1, a skillet 10 according to the invention is shown, comprising a pan 12 of suitable heat conductive material such as cast aluminum, a base 14 for holding electrical heating and temperature control means, a cover 15, and an elongate handle 16 of a suitably heat resistant plastic, feet 18 for the base and a handle 20 for the cover also being formed of a similar heat resistant material. A thermostat dial indicator 22 is provided for controlling a tubular heating element or Calrod 24 which may be cast into the pan as shown for even temperature distribution across the pan bottom. A "jewel" light 26 may also be used in conjunction with the heat indicator 22, which will flash on when the heater starts heating and go off when the desired temperature is reached, and a cooking-frying guide 28 may be embossed on the handle 16 for convenience, if desired.

Conventional skillets have not been adapted for use as deep-fat fryers, and it is one of the major advantages of the invention to provide means for converting the skillet 10 to such use. Accordingly, a perforate basket 30 is provided which is adapted to seat removably in the skillet pan 12, bosses 32 being preferably formed on the bottom of the basket to support the basket in slightly spaced relation to the pan bottom 34, as shown in Fig. 1. However, when it is desired to draw fats from foods which have been deep-fried in the skillet, a handle 36 may be secured to the basket by means of a construction best seen in Fig. 4. The handle 36 is formed from a strong but resilient wire to provide spaced apart extensions 40 which are biased slightly towards one another, and are bent downwardly at a predetermined distance from their free extremities to provide legs 42. A spacer or bridge 44 is slidably received on the extensions, by means of sleeves 46 on each side thereof adapted to ride freely on the extensions 40, and shoulders or ears 48 and 50 are provided in the basket, preferably by means of an integrally formed bracket 52, which are spaced apart a predetermined distance such that the legs 42 will be snugly engaged therein when the spacer 44 is in the position shown in Figs. 2 and 4. The legs are turned transversely at their free ends to provide stops 54 and 56 adapted to engage the shoulders 48 and 50 when the legs are locked therein as shown, and the legs 42 may be provided with intermediate folds 58 and 60 to engage the upper edge 62 of the basket when the legs 42 are retained in the shoulders or ears 48 and 50.

At their outer ends, the extensions 40 have downwardly extending portions 64 integrally formed therewith, and a U-shaped juncture or foot 66 extends in underlying relation to the elongate portions 40 to form a hook 67 as will be hereinafter more fully described.

In order to maintain the basket 30 at a suitable draining elevation in nested relationship in the skillet pan 12, a pair of lugs or rivets 68 and 70 are secured in the basket a predetermined distance downwardly from edge 62 and laterally on either side of the handle 36. As seen in Fig. 5, the rivets 68 and 70 have reduced end portions 72 adapted to be received in apertures 74 of the basket, the end portion 72 being provided with an axial bore 76, and a shoulder 78 intermedite reduced portion 72 and the outer portion of the rivet is adapted to cooperate with a washer 80 to retain the rivet in the basket wall after an annular flange 82 has been riveted over the washer. The other end of the rivet has a head 84 formed thereon, spaced from the basket wall a distance sufficient to permit basket edge 62 to be received therebetween, and to permit the rivets to serve as guide rollers for the basket whereby the basket may be rotated in the skillet. As shown in Fig. 3, the downwardly extending portions 64 are given a length such as to maintain the basket 30 substantially horizontally in the skillet, or at a slight inclination therefrom, and in order that a person's hand may fit easily between the basket handle 36 and the skillet handle 16 when the basket is locked in the draining position hereafter described, the legs 42 are preferably extended upwardly above the basket edge 62 a slight distance as shown at 86 and the downwardly extending portions given a corresponding increment of length.

When the guide rollers 68 and 70 are positioned on the skillet edge 87 and tilted slightly as shown in Fig. 2, the basket handle may be moved into register with the skillet handle 16 by virtue of the aftermentioned slightly longer length of the handle 36 relative to handle 16, so that downwardly extending portions 64 pass freely into alignment with the end of the handle 16 and U-shaped juncture 66 is brought into underlying relation with handle 16. The extensions 64 may be set slightly outwardly from the vertical if desired, although such construction is not essential. When the weight of the basket and the foods contained therein pivot the U-shaped juncture 66 upwardly around the fulcrum points afforded by the lugs 68 and 70, the juncture will engage the underside of the handle 16 with upward force along the bridge 88 and the sides of the juncture 90 and 92 will engage the sides of the handle 16 as seen in Fig. 3. In order that the locking relation thus established may be especially secure, it is preferred that the sides 90 and 92 be inclined downwardly slightly relative to the plane of the handle 16, with the result that the basket is maintained against rotative movement in the skillet and is held securely in the position of Fig. 3 by the spaced support of the lugs 68 and 70 on the basket, and the upward pressure of the juncture 66 on the handle 36. It will be appreciated that the included angle between the lugs 68 and 70 and the center of the basket may vary without departing from the concept of the invention, but in any case should be less than 180° in order to permit the weight of the basket to exert the desired leverage on the handle.

In removing the basket from locked draining position on the skillet, the handle 36 may be moved downwardly as shown in Fig. 3 to disengage the U-shaped foot 66 from skillet handle 16, and thereupon moved laterally out of registration with the skillet handle 16 with the basket 32 tracking along the skillet edge 87 on its guide lugs 68 and 70. The downward movement of handle 36 may be effected most easily by grasping both handle 36 and handle 16 with one hand and bringing the heel of the hand to bear downwardly on handle 36. Since elongate portions 40 are resilient, as described, the handle 36 will disengage from handle 16 even though the weight of the food-laden basket causes the basket to remain substantially stationary vertically.

The basket can then be lifted slightly to free the guides 68 and 70 from the skillet edge 87, and thereupon lowered into position in the skillet as shown in Fig. 1. The handle 36 can then be removed from the basket by sliding the spacer 44 outwardly along the elongate portion 40 of the handle, whereupon the legs 42 are brought together as described and may be lifted upwardly from the shoulders 48 and 50, the transverse stops 54 and 56 being of a width to permit them to pass between the shoulders without difficulty when the legs are so positioned. Thereupon, the cover 15 may be placed on the skillet, if desired, as also shown in Fig. 1.

Accordingly, there has been provided a skillet which can be used either in the kitched or the dining room, so that the "coals" is not detained in the kitchen while foods are being fried therein, and which permits draining of the foods after cooking, directly into the skillet without the necessity of holding the basket manually. The skillet can be moved easily without taking the basket from its draining position, the weight of the basket maintaining the beaded lugs therein firmly on the skillet edge and holding the contoured foot of the basket handle against the skillet handle so that the basket will not be released accidentally. Since the basket handle can be disengaged from the skillet handle, the utensil does not require a skilled operator, and after the handle has been removed from the basket as described, the skillet can be stored in a minimum of space.

Having thus described the invention and certain embodiments thereof, it will be readily appreciated to those skilled in the art how the objects mentioned are accomplished and how various and further modifications and changes may be made without departing from the spirit of the invention, the scope of which is commensurate with the appended claims.

I claim:

1. In combination with a vessel having an elongate handle and a container removably received in said vessel, a lug on the exterior of said container intermediate the upper and lower boundaries of said container, a handle on said container having an elongate portion adapted to extend in overlying relation to the handle on said vessel and a hook portion integrally formed with said elongate portion having a foot contoured for locking engagement with the handle on said vessel when said lug is disposed in supporting relationship on the edge of said vessel in underlying abutting relation to said elongate portion, said elongate portion being resilient whereby said foot may be manually moved downwardly out of locking engagement with said handle on said vessel.

2. In combination with a vessel having an elongate handle and a container removably nesting in said vessel, said container having a handle with an elongate portion adapted to extend in overlying relation to the handle on said vessel, a hook portion being integrally formed with said elongate portion said hook portion having a foot contoured for locking engagement with the handle on said vessel and disposed in underlying relation to said elongate portion, said elongate portion being resilient whereby said foot may be manually moved downwardly out of locking engagement with said handle on said vessel, and a pair of lugs on the exterior of said container spaced a predetermined distance downwardly and laterally from said elongate portion on either side thereof adapted to rest on the edge of said vessel to fulcrum said foot upwardly against the handle of said vessel.

3. In combination with a vessel having an elongate handle and a container removably nesting atop said vessel, said container having a handle with an elongate portion adapted to extend in overlying relation to the handle of said vessel, a predetermined distance past the outer extremity of the handle for said vessel, said elongate portion having a hook portion integrally formed with the outer end of said elongate portion, said hook portion including a downwardly extending portion and a foot contoured for locking engagement with the handle on said vessel, and a pair of guide rollers on the exterior of said container spaced a predetermined distance downwardly and laterally from said elongate portion adapted to rest on the edge of said vessel to fulcrum said foot upwardly against said handle on said vessel, said elongate portion being resilient for affording downward movement of said foot, said guide rollers being adapted to track on the edge of said vessel upon said downward movement of said foot to place said container in a release position relative to said vessel.

4. In combination with a vessel having an elongate handle, a basket removably nested atop said vessel, said basket having a handle formed from a wire and providing spaced apart extensions, said extensions terminating in a U-shaped outer juncture, said basket having a pair of guide lugs on the external surface thereof, said guide lugs being spaced downwardly from the upper edge of said basket a predetermined distance and spaced laterally from said handle a predetermined distance on either side thereof, said handle extending outwardly a predetermined distance beyond the handle for said vessel when said lugs are engaged on the upper edge of said container and having a downwardly and inwardly extending portion such as to present said U-shaped juncture against the handle for said vessel in underlying relation thereto, with the portions of said extensions immediately adjacent said juncture abutting the sides of said handle for said vessel and extending slightly beyond the end thereof, said wire affording resilient downward movement of said basket handle for manual disengagement from said handle for said vessel, said guide lugs being adapted to track along the edge of said container upon said disengagement to place said basket in release position.

5. In combination with a vessel having an elongate handle, a basket nested atop said vessel having a handle of a wire construction and including a pair of spaced apart extensions and a U-shaped outer juncture for said extensions, said basket having a pair of guide lugs on the exterior surface thereof each having a head portion of relatively wide diameter spaced downwardly from the upper edge of said basket a predetermined distance and spaced laterally from said handle a predetermined distance on either side thereof, said handle for said basket extending outwardly a predetermined distance beyond the handle for said vessel when said lugs are resting on the upper edge of said vessel and downwardly and inwardly to present said U-shaped juncture against the handle for said vessel in underlying relation thereto with the portions of said extensions immediately adjacent said juncture abutting the sides of said handle for said vessel and extending slightly beyond the end thereof at a slight upward inclination relative to the plane of said handle, said wire affording resilient downward movement of said basket handle for manual disengagement from said handle for said vessel, said guide lugs being adapted to track along the edge of said vessel upon said disengagement to place said basket in release position.

6. In combination with a vessel having an elongate handle, a basket atop said vessel, said basket having a handle of a wire construction providing spaced apart extensions and a U-shaped outer juncture for said extensions, said basket having a pair of guide lugs on its external surface spaced downwardly a predetermined distance from the upper edge thereof and spaced laterally from said handle a predetermined distance, said handle for said basket extending outwardly a predetermined distance beyond the handle for said vessel when said lugs are resting on the upper edge of said vessel and, said handle for said basket downwardly and inwardly at its outer end to present said U-shaped juncture against the handle for said vessel in underlying relation thereto, the portions of said extensions immediately adjacent said juncture abutting the sides of said handle for said vessel and extending slightly beyond the end thereof, said wire affording resilient downward movement of said basket handle and said U-shaped juncture for manual disengagement thereof from said handle for said vessel, said guide lugs being adapted to track along the edge of said vessel upon said disengagement to place said basket in release position, said basket being provided with spaced apart ears and said extensions being turned downwardly a predetermined distance from its free ends and having stops adapted to abut said ears at its free ends, and a spacer slidably received on said extensions adapted to bias said downwardly turned portions of said extensions adjacent said ends against said ears for locking engagement therewith when disposed in a position on said downwardly turned portions and to release said downwardly turned portions from said ears when disposed in a portion on said extensions relatively remote from said downwardly turned portions.

References Cited in the file of this patent
UNITED STATES PATENTS
2,593,549    Finch _____ Apr. 22, 1952